US007991541B2

(12) United States Patent
Heider et al.

(10) Patent No.: US 7,991,541 B2
(45) Date of Patent: Aug. 2, 2011

(54) METHOD FOR IMPROVING THE RUNNING SMOOTHNESS OF AN INTERNAL COMBUSTION ENGINE, CONTROL DEVICE AND INTERNAL COMBUSTION ENGINE

(75) Inventors: Timo Heider, Grävenwiesbach (DE); Wolfgang Krostewitz, Friedberg (DE); Wolfgang Ludwig, Butzbach-Maibach (DE)

(73) Assignee: Continental Automotive GmbH, Hannover (DE)

( * ) Notice: Subject to any disclaimer, the term of this patent is extended or adjusted under 35 U.S.C. 154(b) by 293 days.

(21) Appl. No.: 12/306,805

(22) PCT Filed: Oct. 8, 2007

(86) PCT No.: PCT/EP2007/060659

§ 371 (c)(1),
(2), (4) Date: Dec. 29, 2008

(87) PCT Pub. No.: WO2008/046755

PCT Pub. Date: Apr. 24, 2008

(65) Prior Publication Data

US 2009/0281712 A1 Nov. 12, 2009

(30) Foreign Application Priority Data

Oct. 17, 2006 (DE) ........................ 10 2006 048 982

(51) Int. Cl.

| | |
|---|---|
| ***G06F 19/00*** | (2006.01) |
| ***F02D 41/14*** | (2006.01) |
| ***F02D 41/34*** | (2006.01) |
| ***F02M 51/00*** | (2006.01) |

(52) U.S. Cl. ......... 701/111; 701/104; 123/436; 123/481

(58) Field of Classification Search ............. 123/406.23, 123/406.24, 406.26, 406.29, 435, 436, 481, 123/198 DB, 198 F; 701/101–105, 110, 701/111, 114, 115; 73/114.04, 114.22; 702/182–185

See application file for complete search history.

(56) References Cited

U.S. PATENT DOCUMENTS 5,190,013 A 3/1993 Dozier .......................... 123/481
5,433,107 A 7/1995 Angermaier et al. ........ 73/117.3
5,539,644 A * 7/1996 Ichikawa et al. .............. 701/111
(Continued)

FOREIGN PATENT DOCUMENTS

DE 2529208 2/1977
(Continued)

OTHER PUBLICATIONS

International PCT Search Report, PCT/EP2007/060659, 12 pages, Mailed Jan. 25, 2008.

*Primary Examiner* — Willis R Wolfe, Jr.
(74) *Attorney, Agent, or Firm* — King & Spalding L.L.P.

(57) ABSTRACT

In a method for improving the running smoothness of an internal combustion engine (1) which has at least one combustion chamber and at least one controllable actuator whose position has an influence on the combustion in the at least one combustion chamber, an irregular running value (f) of the internal combustion engine (1) is determined and compared with a predefined first irregular running limit value (f1thres), and in the event of the irregular running value (f) exceeding a predefined first irregular running limit value (f1thres), the actuator is moved from a starting position into an end position while the combustion in all of the combustion chambers of the internal combustion engine (1) is continued.

19 Claims, 3 Drawing Sheets

U.S. PATENT DOCUMENTS

| | | | | |
|---|---|---|---|---|
| 6,006,152 | A | 12/1999 | Schwarzenthal | 701/102 |
| 6,021,765 | A | 2/2000 | DeGroot et al. | 123/568.21 |
| 6,082,188 | A | 7/2000 | Angermaier et al. | 73/117.3 |
| 6,418,785 | B1 * | 7/2002 | Hatazawa et al. | 73/114.08 |
| 6,575,133 | B2 | 6/2003 | Ries-Mueller et al. | 123/306 |
| 6,584,834 | B1 * | 7/2003 | Lehner et al. | 73/114.08 |
| 6,918,288 | B2 | 7/2005 | Lehner et al. | 73/117.3 |
| 7,110,874 | B1 * | 9/2006 | Kabele | 701/114 |
| 7,210,456 | B2 * | 5/2007 | Moriya et | 123/435 |
| 7,219,003 | B2 * | 5/2007 | Hagel et al. | 123/436 |
| 7,234,446 | B2 * | 6/2007 | Toyoda | 123/406.14 |
| 7,278,391 | B1 * | 10/2007 | Wong et al. | 123/198 F |
| 7,458,249 | B2 * | 12/2008 | Kassner | 73/35.06 |
| 2002/0157459 | A1 | 10/2002 | Lehner et al. | 73/117.3 |
| 2007/0101806 | A1 * | 5/2007 | Yamaguchi | 73/117.3 |

FOREIGN PATENT DOCUMENTS

| | | |
|---|---|---|
| DE | 10001583 | 8/2001 |
| EP | 0576705 | 1/1994 |
| EP | 0818619 | 1/1998 |
| WO | 97/22786 | 6/1997 |
| WO | 01/59422 | 8/2001 |
| WO | 03/081006 | 10/2003 |

* cited by examiner

METHOD FOR IMPROVING THE RUNNING SMOOTHNESS OF AN INTERNAL COMBUSTION ENGINE, CONTROL DEVICE AND INTERNAL COMBUSTION ENGINE

CROSS-REFERENCE TO RELATED APPLICATIONS

This application is a U.S. National Stage Application of International Application No. PCT/EP2007/060659 filed Oct. 8, 2007, which designates the United States of America, and claims priority to German Application No. 10 2006 048 982.9 filed Oct. 17, 2006, the contents of which are hereby incorporated by reference in their entirety.

TECHNICAL FIELD

The invention relates to a method for improving the running smoothness of an internal combustion engine, a control device, which is embodied in such a way that it can carry out said method, as well as an internal combustion engine, which comprises such a control device.

BACKGROUND

A method for the detection of combustion misfires in an internal combustion engine is known from EP 0 576 705 A1. According to this method, the period of time is measured during which the crankshaft turns by a predefined angular amount. The angular velocity is measured with the aid of defined marks on a wheel coupled to the crankshaft. The difference between the measured, consecutive periods of time is compared to a threshold value. Combustion misfires lead to a temporary slowing down of the angular velocity of the crankshaft because the torque component of the misfiring for driving the crankshaft is absent. As the angular velocity slows down the difference between the measured consecutive periods of time increases. If a predefined threshold value is exceeded a combustion misfiring is detected and the relevant cylinder is switched off. No measures are taken below the predefined threshold value. Despite this, uneven running below the threshold value can lead to an uncomfortable driving behavior.

SUMMARY

According to various embodiments, a method, a control device and an internal combustion engine can be made available by means of which improved running smoothness of the internal combustion engine can be achieved.

According to an embodiment, a method for improving the running smoothness of an internal combustion engine which has at least one combustion chamber and at least one controllable actuator, the position of which has an influence on the combustion in the at least one combustion chamber, may comprise the steps of: determining an uneven running value of the internal combustion engine, comparing the uneven running value with a predefined first uneven running threshold value, in the event of the uneven running value exceeding the first uneven running threshold value, moving the actuator from a starting position into an end position while the combustion in all of the combustion chambers of the internal combustion engine being continued, and wherein the uneven running value being determined in an individual manner for each combustion chamber, and in the event of the uneven running value in one of the combustion chambers exceeding a predefined second uneven running threshold value, which is greater than that of the first uneven running threshold value, suppressing the combustion in the corresponding combustion chamber.

According to a further embodiment, the end position can be characterized by the influence of the actuator on the combustion in the end position being minimal. According to a further embodiment, in the event of an improvement in the running smoothness when the actuator moves to the end position, the actuator may remain in the end position. According to a further embodiment, in the event of an improvement in the running smoothness when the actuator moves to the end position, an entry may be made into a memory device allocated to the internal combustion engine. According to a further embodiment, the internal combustion engine may have a plurality of actuators, the position of which in each case has an influence on the combustion in at least one of the combustion chambers, and wherein for at least some of the actuators, the method steps may be carried out individually. According to a further embodiment, one of the actuators involved may be a tank breather valve, which is arranged in a ventilation line between a fuel vapor reservoir and an inlet manifold of the internal combustion engine and which, in an open position, pneumatically connects the fuel vapor reservoir with the inlet manifold and, in a closed position, pneumatically disconnects the fuel vapor reservoir from the inlet manifold, and wherein the tank breather valve being closed in the event of the uneven running value exceeding the predefined first uneven running threshold value. According to a further embodiment, the actuator involved may be an exhaust gas recirculation valve, which is arranged in an exhaust gas recirculation line between an exhaust gas tract and an inlet manifold of the internal combustion engine and which, in an open position, pneumatically connects the exhaust gas tract with the inlet manifold and, in a closed position, pneumatically disconnects the exhaust gas tract from the inlet manifold, and wherein the exhaust gas recirculation valve being closed in the event of the uneven running value exceeding the predefined first uneven running threshold value. According to a further embodiment, the actuator involved may be a swirl flap, which is arranged in an intake tract of the internal combustion engine. According to a further embodiment, the actuator involved may be an adjusting mechanism for a valve by means of which the gas flow through the combustion chamber is controlled.

According to another embodiment, a control device for an internal combustion engine, which has at least one combustion chamber and at least one controllable actuator, the position of which has an influence on the combustion in the at least one combustion chamber, may comprise for improving the running smoothness of the internal combustion engine, means for determining an uneven running value, which determine an uneven running value of the internal combustion engine, a comparator comparing the uneven running value with a predefined first uneven running threshold value, and wherein the control device is operable, in the event of the uneven running value exceeding the predefined first uneven running threshold value, to control the actuator to move from a starting position into an end position while the combustion in all of the combustion chambers of the internal combustion engine is continued, and to determine the uneven running value individually for each combustion chamber, and wherein the control device is further operable, in the event of the uneven running value in one of the combustion chambers exceeding a predefined second uneven running threshold value, which is greater than that of the first uneven running threshold value, to prevent the combustion in the corresponding combustion chamber.

According to a further embodiment, the end position may be characterized in that the influence of the actuator on the combustion is minimal in the end position.

According to yet another embodiment, an internal combustion engine may comprise a control device as described above.

BRIEF DESCRIPTION OF THE DRAWINGS

The invention is described in more detail below with reference to an exemplary embodiment specified in the schematic figures of the drawing, in which.

DETAILED DESCRIPTION

Figure 1:
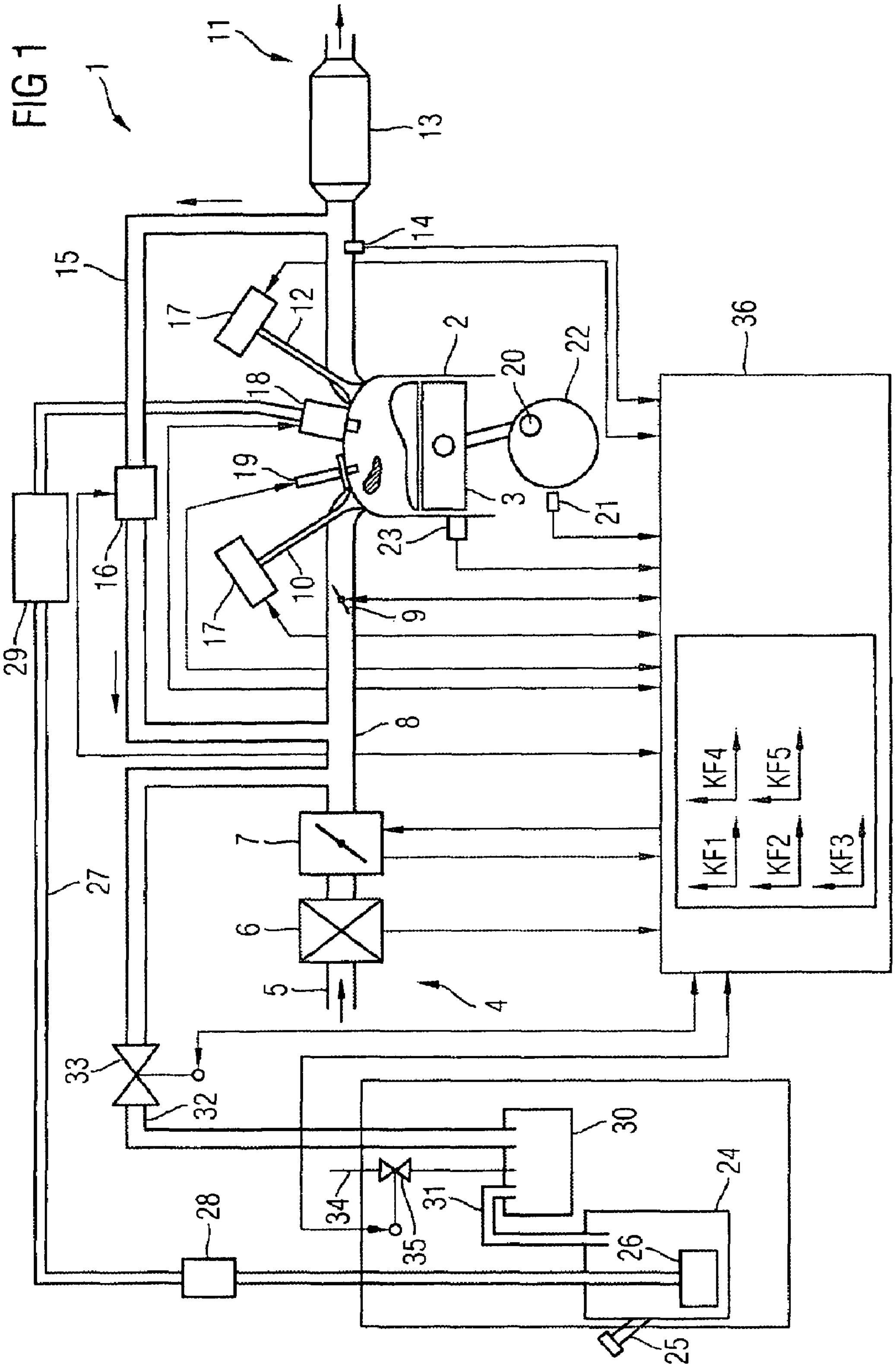
FIG. 1 shows a schematic view of an internal combustion engine with a fuel supply system.

The method for improving the running smoothness in accordance with an embodiment relates to an internal combustion engine, which has at least one combustion chamber and at least one adjustable or controllable actuator of which the position has an influence on the combustion in the at least one combustion chamber. In accordance with the method, an uneven running value of the internal combustion engine is determined and compared with a predefined first uneven running threshold value. In the event of the uneven running value exceeding the first uneven running threshold value, the actuator is moved from a current starting position into an end position while the combustion in all of the combustion chambers of the internal combustion engine is continued. In the event of the uneven running value exceeding a predefined second uneven running threshold value, which is greater than the first uneven running threshold value, the combustion in at least one cylinder is suppressed.

The various embodiments are based on the knowledge that in addition to a defect in the ignition system or in the injection system of the internal combustion engine, other actuators, which are for example arranged in the intake tract or in the exhaust gas tract of the internal combustion engine, may also cause ignition failures and as a result a worsened running smoothness. In the event of an out-of-adjustment condition or bad positioning of these actuators, for example, infiltrated secondary air may be fed into the combustion chamber or the flow behavior of the gases led into the internal combustion engine may be influenced considerably.

Ignition failures may occur in both cases. Compared with the prior art, in which the injection or the ignition is completely deactivated by switching off when the threshold value for the uneven running single cylinder is exceeded, an improvement is achieved in accordance with the method according to an embodiment by changing the current position of the actuator while continuing the combustion in all of the cylinders. As a result, the performance of all the cylinders of the internal combustion engine at a simultaneously improved running smoothness is available. It must further be considered that although a switching off of one of the cylinders in the case of ignition failures reduces the emission of harmful substances, it affects the running smoothness of an internal combustion engine in a negative way on the whole. In addition to the first uneven running threshold value, a higher second uneven running threshold value is predefined, and once said value is exceeded, the combustion in the relevant combustion chamber is suppressed. This can be done for example by deactivating the ignition and/or the injection into the combustion chamber in question. In this process the second uneven running threshold value can be dimensioned in such a way that, if it is exceeded, it can be assumed that there is an error in the injection or the ignition or the emission of harmful substances can only be reduced sufficiently by switching off one of the combustion chambers.

In an embodiment of the method, the end position is characterized in that the influence of the actuator on the combustion is minimal in the end position.

In the case of this embodiment, the knowledge is based on the fact that the probability for improving the running smoothness is the greatest when the actuator has been moved into a position in which its influence on the combustion is the most insignificant.

In an embodiment of the method, the actuator remains in the end position if an improvement in the running smoothness is detected after the actuator has taken up the end position.

By fixing the actuator in the end position, the running smoothness of the internal combustion engine is improved permanently. A further negative influence of the actuator on the running smoothness is avoided as a result of this.

In an embodiment of the method, in the event of the running smoothness being improved on account of the fact that the actuator moves into the end position, an entry is made in a memory device assigned to the internal combustion engine.

Such an entry into the memory device can for example be read out during the next service and corresponding measures can be taken to eliminate the defect.

In an embodiment of the method, the internal combustion engine has a plurality of actuators, the position of which in each case has an influence on the combustion in the at least one combustion chamber, with the method steps being performed individually for at least some of the actuators.

With this embodiment of the method it is possible to determine the influence of each actuator on the running smoothness individually. As a result, it is possible to identify, from a plurality of actuators, that actuator which might be influencing the running smoothness of the internal combustion engine in a negative way. This makes it easier at a later stage to identify the source of the error, such as for example during an inspection, as a result of which the error can be eliminated in a quicker and more cost-effective way. In addition, the actuators, which are not causing the uneven running, can continue to be fully used.

In the embodiment of the method, one of the actuators involved is a tank breather valve which is arranged in a breather line between a fuel vapor reservoir and an inlet manifold of the internal combustion engine and which, in an open position, pneumatically connects the fuel vapor reservoir with the inlet manifold and, in the closed position, pneumatically disconnects the fuel vapor reservoir from the inlet manifold, with the tank breather valve being closed in the event of the uneven running value exceeding the predefined first uneven running threshold value.

In the embodiment of the method, one of the actuators involves an exhaust gas recirculation valve which is arranged in an exhaust gas recirculation line between an exhaust gas tract and an inlet manifold of the internal combustion engine and which, in the open position, pneumatically connects the exhaust gas tract with the inlet manifold and, in the closed position pneumatically disconnects the exhaust gas tract from the inlet manifold, with the exhaust gas recirculation valve being closed possible in the event of the uneven running value exceeding the predefined first uneven running threshold value.

In an open position of the tank breather valve, fuel vapors can arrive from the fuel vapor reservoir in the inlet manifold and take part in the combustion. In the same way, in an open position of the exhaust gas recirculation valve, exhaust gases from the exhaust gas tract can arrive in the inlet manifold and the combustion chamber. That is why, in the case of an incorrect positioning of the tank breather valve or the exhaust gas recirculation valve, secondary air can end up in the combustion chamber, which may lead to ignition failures and as a result adversely affect the running smoothness of the internal combustion engine. The running smoothness of the internal combustion engine is improved in accordance with said embodiments by the tank breather valve or the exhaust gas recirculation valve being closed and in this way the entry of foreign air being prevented.

In further embodiments, one of the actuators can involve a swirl plate, which is arranged in the intake tract of the internal combustion engine and/or an adjusting mechanism for a valve by means of which the gas flow through the combustion chamber is controlled.

The swirl flap has a considerable influence on the flow behavior of the gasses flowing into the combustion chamber. The adjusting mechanism, by means of which both the lift and the opening point in time and the closing point in time of an intake valve or an exhaust valve of the internal combustion engine can be adjusted, likewise influences the combustion in the combustion chamber depending on the position.

A control device in accordance with yet another embodiment is embodied in such a way as to enable it to carry out the method as described above. An internal combustion engine in accordance with claim 12 includes such a control device.

With regard to the advantages of the control device and the internal combustion engine, reference is made to the embodiments of the method.

FIG. 1 shows a schematic diagram of an internal combustion engine 1 with direct fuel injection and with a fuel supply system. The internal combustion engine 1 has at least one cylinder 2 and a piston 3 that moves up and down in the cylinder 2. The fresh air necessary for the combustion is introduced into a combustion chamber bounded by the cylinder 2 and the piston 3 by means of an intake tract 4. Downstream of an intake opening 5, located in the intake tract 4 there is an air mass sensor 6 for detecting the air throughput in the intake tract 4, a throttle valve 7 for controlling the air throughput in the intake tract 4, an inlet manifold 8, a swirl flap 9 for influencing the inflow behavior of the gas flow into the combustion chamber and an inlet valve 10 by means of which the combustion chamber is optionally connected to or disconnected from the intake tract 4.

The combustion exhaust gases are expelled via an exhaust gas tract 11 of the internal combustion engine 1. The combustion chamber is optionally connected to or disconnected from the exhaust gas tract 11 by means of an exhaust valve 12. The exhaust gases are purified in an exhaust gas purifying catalytic converter 13. In addition, in the exhaust gas tract 11, there is a so-called lambda sensor 14 for measuring the oxygen content in the exhaust gas. The exhaust gas tract 11 and the inlet manifold 8 in the intake tract 4 can be connected by means of an exhaust gas recirculation line 15 and a controllable exhaust gas recirculation valve 16 arranged in the exhaust gas recirculation line 15.

The intake valve 10 and the exhaust valve 12 in each case have an adjusting mechanism 17 that can be controlled, by means of which the valve lift and/or the valve opening times and the valve closing times can be adjusted.

The fuel is injected directly into the combustion chamber by means of an injection valve 18 projecting into the combustion chamber. The ignition of the fuel mixture takes place by means of a spark plug 19. The motive energy generated by the combustion is transferred by means of a crankshaft 20 to the drive train of the motor vehicle (not illustrated). In this case, a rotational speed sensor 21 detects the rotational speed of the crankshaft 20. This may, as is known, take place by means of the rotational speed sensor 21 detecting the rotation of a transmitter wheel 22 coupled with a crankshaft 20. In the case of a multicylinder internal combustion engine 1, a specific cylinder 2 is in this process allocated to each segment or sector of the transmitter wheel 22. In addition, the internal combustion engine 1 has one pressure sensor 23 per combustion chamber for the detection of the combustion pressure in each combustion chamber.

The fuel supply system of the internal combustion engine 1 comprises a fuel tank 24 to which fuel can be fed through a filler cap 25 that can be closed. The fuel is fed into the injection valves by means of a fuel pump 26 through a fuel supply line 27. In this process, a high-pressure pump 28 and a pressure reservoir 29 are arranged in the fuel supply line 27. The high-pressure pump 28 has the task of feeding the fuel under high pressure to the pressure reservoir 29. In this process, the pressure reservoir 29 is embodied as a common pressure reservoir 29 for all the injection valves 18. All the injection valves 18 are fed with pressurized fuel from said reservoir.

In addition, the fuel supply system of the internal combustion engine 1 has a tank ventilation device. A fuel vapor reservoir 30 is a part of the tank ventilation device, said reservoir for example being embodied as an activated charcoal container and connected to the fuel tank 24 by means of a connecting line 31. The fuel vapors developing in the fuel tank 24 are fed into the fuel vapor reservoir 30 and adsorbed there by the activated carbon. The fuel vapor reservoir 30 is connected to the inlet manifold 8 of the internal combustion engine 1 by means of a ventilation line 32. In the ventilation line 32, there is a controllable tank breather valve 33. In addition, fresh air can be fed into the fuel vapor reservoir 30 by means of a ventilation line 34 and an optional controllable ventilation valve 35 arranged therein. In certain operating ranges of the internal combustion engine 1, in particular during idling or during partial load operation, opening the tank breather valve 33 and the ventilation valve 34 results in a purging effect in the case of which the fuel vapors stored in the fuel vapor reservoir 30 are fed into the inlet manifold 8 and take part in the combustion.

A control device 36 has been allocated to the internal combustion engine 1 in which characteristic curve-specific engine control functions (KF1 to KF5) have been implemented in terms of software. The control device 36 is connected to all the actuators and the sensors of the internal combustion engine 1 by means of signal lines and data lines. In practice, the control device 36 is connected, among others to the controllable ventilation valve 35, the controllable tank breather valve 33, the air mass sensor 6, the controllable throttle valve 7, the controllable exhaust gas recirculation valve 16, the controllable injection valve 18, the spark plug 19, the controllable valve adjusting mechanisms 17, the controllable swirl flap 9, the pressure sensor 23, the lambda sensor 14 and the rotational speed sensor 21.

A few of the actuators of the internal combustion engine 1 have an influence on the combustion in the combustion chambers. The tank breather valve 33, the exhaust gas recirculation valve 16, the swirl flap 9 and the valve adjusting mechanism 17 can be mentioned as examples here in particular. Depending on their position, the influence on the combustion is defined differently. While for example in the case of an opened tank breather valve 33, fuel vapors are fed into the inlet manifold 8 and take part in the combustion, the influx of fuel vapors in the inlet manifold 8 in the case of a closed tank breather valve 33 is prevented. In the same way, in the case of an opened exhaust gas recirculation valve 16, part of the exhaust gases is fed into the inlet manifold 8 and also in this case influences the combustion, while this is however not the case when the exhaust gas recirculation valve is closed. Depending on its setting angle, the swirl flap 9 influences the flow-in behavior of fresh air into the combustion chamber and as a result the combustion in the combustion chamber to a certain degree. Depending on the position of the adjusting mechanisms 17 for the valves 10, 12, different valve lifts occur for valves 10, 12, as well as different opening points in time and closing points in time. This also has an influence on the combustion in the combustion chamber. On account of this influencing of the combustion by means of the actuators, poor combustion or even ignition failures may occur when there is a defect or the positioning of one of the actuators is faulty, which may cause uneven running of the internal combustion engine 1.

The uneven running of the internal combustion engine 1 is monitored by the control device 36 by means of the rotational speed sensor 21 and/or the pressure 23. This can for example take place when the control device 36 detects an uneven running value $\phi$ by evaluating signals from the rotational speed sensor 21 or the pressure sensor 23, which sets a standard for the uneven running. As a result, the control device can be regarded as a means for the determination of the uneven running value $\phi$. On using the signal of the pressure sensor 23, the pressure curve in one of the combustion chambers can for example be compared with the pressure curve in the other combustion chambers and corresponding deviations can be interpreted as uneven running. As has already been mentioned above, the rotational speed sensor 21 scans the transmitter wheel 22 that is coupled with the crankshaft 20. In this process, a specific sector has been allocated to a transmitter wheel 22 in each combustion chamber. By means of the rotational speed sensor 21, the control device 36 calculates the rotational speed of the transmitter wheel 22 and evaluates said rotational speed in an individual manner for the combustion chamber-specific sectors. The speed by means of which the sectors and the rotational speed sensor 21 move past, sets a standard for the torque contribution and with that for the quality of the combustion for each combustion chamber. Should the control device 36 therefore detect, for example, in a stationary operating mode, in a certain sector, a deviation compared with the other sectors, an uneven running value $\phi$ can thus be calculated from this. At this point, reference is also made to the patent application publication EP 0 576 705 A1, wherein a method for the determination of uneven running is described in detail.

An exemplary embodiment of the method for improving the running smoothness of the internal combustion engine 1 is explained in more detail below with reference to the flowchart in FIG. 2.

After the start of the method in a step 100, the control device 36, in a step 101, determines the uneven running value $\phi$ of the internal combustion engine 1, by continuously evaluating the signals of the rotational speed sensor 21 and/or the pressure sensor 23. Furthermore, a test is carried out in a step 102 in order to determine whether or not the uneven running value $\phi$ exceeds a predefined first uneven running threshold value $\phi 1_{thres}$. Should this not be the case, then said test request will be repeated. However, should the uneven running threshold value $\phi 1_{thres}$ be exceeded, the control device 36 in a step 103, will identify the combustion chamber causing the increased uneven running. This is possible by the clear allocation of the segments or the sectors on the transmitter wheel 22.

Subsequently, a test will be carried out in a step 104 in order to determine whether or not the uneven running value $\phi$ exceeds a predefined second uneven running threshold value $\phi 2_{thres}$. Should this be the case, the combustion chamber responsible for the increased uneven running will be deactivated in a step 105 by deactivating the relevant injection valve 18 or the relevant spark plug 19. However, should this not be the case, i.e. that the uneven running value $\phi$ lies between the first uneven running threshold value $\phi 1_{thres}$ and the second uneven running threshold value $\phi 2_{thres}$, then in a step 106, the first actuator is moved from its current starting position into an end position. In this process, the end position is selected in such a way that the influence of the actuator in the end position on the combustion is minimal or the combustion is advantageously stabilized.

As a result, the control device 36 tests in a step 107 whether or not varying the position of the first actuator, results in a reduction in uneven running. Should this be the case, then in a step 108, the first actuator is fixed in the end position and an entry into a memory device (not illustrated) is made, which can be read out and evaluated electronically during the next service. However, should no reduction in the uneven running be determined in a step 107, then in a step 109, the first actuator will again be moved into the starting position.

Subsequently, in a step 110, a second actuator is moved from its current starting position into an end position. Subsequently, a test is carried out in a step 111 in order to determine whether or not there has been a reduction in the uneven running by varying the position. Should this be the case, then in a step 112, the second actuator will be fixed in this end position and also in this case an entry will be made into the memory device. However, should no reduction in the uneven running be determined, then in a step 113, the second actuator will be moved back into the starting position.

Even if in the exemplary embodiment of the method in accordance with FIG. 4, the method is ended at this point with a step 114, it should be pointed out that the method steps 106 to 109 or 110 to 113 can still be applied in the same way to additional actuators.

Figure 2A:
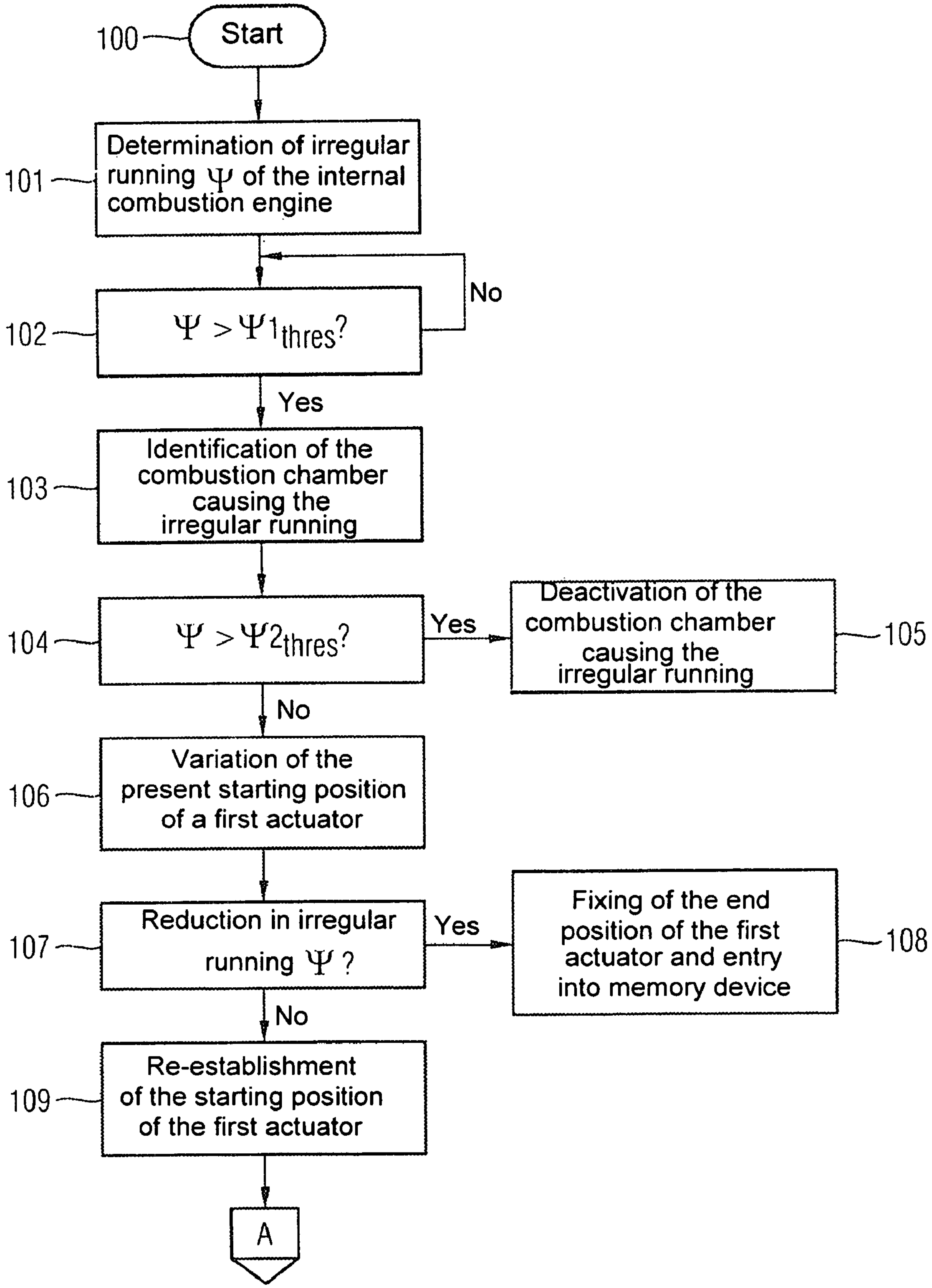
FIG. 2A.
Figure 2B:
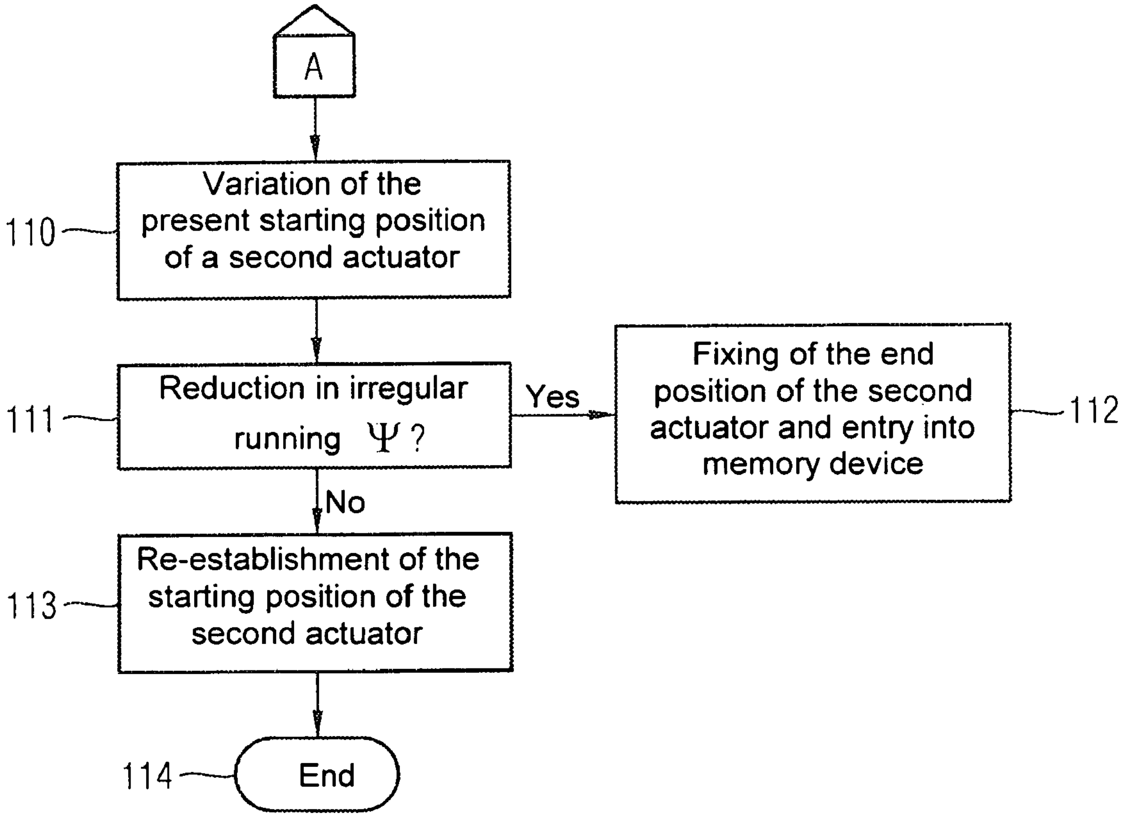
FIG. 2B shows a flowchart of an exemplary embodiment of a method for improving the running smoothness of an internal combustion engine.

It is also pointed our that the method in accordance with the invention is not limited to the exemplary embodiment in accordance with FIG. 2 in that uneven running of an individual combustion chamber is determined. The method can also be used in such cases when a general uneven running of the internal combustion engine is detected, which cannot be allocated to specific combustion chambers. However, the allocation of uneven running to individual combustion chambers allows the identification and the explicit switching off of those combustion chambers which are causing uneven running.

What is claimed is:

1. A method for improving the running smoothness of an internal combustion engine which has at least one combustion chamber and at least one controllable actuator, the position of which has an influence on the combustion in the at least one combustion chamber, with the method comprising the steps of:

determining an uneven running value of the internal combustion engine, comparing the uneven running value with a predefined first uneven running threshold value, in the event of the uneven running value exceeding the first uneven running threshold value, moving the actuator from a starting position into an end position while the combustion in all of the combustion chambers of the internal combustion engine being continued, and wherein the uneven running value being determined in an individual manner for each combustion chamber, and in the event of the uneven running value in one of the combustion chambers exceeding a predefined second uneven running threshold value, which is greater than that of the first uneven running threshold value, suppressing the combustion in the corresponding combustion chamber.

2. The method according to claim 1, wherein the end position being characterized by the influence of the actuator on the combustion in the end position being minimal.

3. The method according to claim 1, wherein the internal combustion engine having a plurality of actuators, the position of which in each case has an influence on the combustion in at least one of the combustion chambers, and wherein for at least some of the actuators, the method steps being carried out individually.

4. The method according to claim 1, wherein one of the actuators involved being a tank breather valve, which is arranged in a ventilation line between a fuel vapor reservoir and an inlet manifold of the internal combustion engine and which, in an open position, pneumatically connects the fuel vapor reservoir with the inlet manifold and, in a closed position, pneumatically disconnects the fuel vapor reservoir from the inlet manifold, and with wherein the tank breather valve being closed in the event of the uneven running value exceeding the predefined first uneven running threshold value.

5. The method according to claim 1, wherein the actuator involved being an exhaust gas recirculation valve, which is arranged in an exhaust gas recirculation line between an exhaust gas tract and an inlet manifold of the internal combustion engine and which, in an open position, pneumatically connects the exhaust gas tract with the inlet manifold and, in a closed position, pneumatically disconnects the exhaust gas tract from the inlet manifold, and wherein the exhaust gas recirculation valve being closed in the event of the uneven running value exceeding the predefined first uneven running threshold value.

6. The method according to claim 1, wherein the actuator involved being a swirl flap, which is arranged in an intake tract of the internal combustion engine.

7. The method according to claim 1, wherein the actuator involved being an adjusting mechanism for a valve by means of which the gas flow through the combustion chamber is controlled.

8. The method according to claim 1, wherein, in the event of an improvement in the running smoothness when the actuator moves to the end position, the actuator remaining in the end position.

9. The method according to claim 8, wherein, in the event of an improvement in the running smoothness when the actuator moves to the end position, an entry being made into a memory device allocated to the internal combustion engine.

10. A control device for an internal combustion engine, which has at least one combustion chamber and at least one controllable actuator, the position of which has an influence on the combustion in the at least one combustion chamber, wherein the control device comprises for improving the running smoothness of the internal combustion engine, means for determining an uneven running value, which determine an uneven running value of the internal combustion engine, a comparator comparing the uneven running value with a predefined first uneven running threshold value, and wherein the control device is operable in the event of the uneven running value exceeding the predefined first uneven running threshold value, to control the actuator to move from a starting position into an end position while the combustion in all of the combustion chambers of the internal combustion engine is continued, and to determine the uneven running value individually for each combustion chamber, and wherein the control device is further operable in the event of the uneven running value in one of the combustion chambers exceeding a predefined second uneven running threshold value, which is greater than that of the first uneven running threshold value, to prevent the combustion in the corresponding combustion chamber.

11. The control device according to claim 10, wherein the end position being characterized in that the influence of the actuator on the combustion is minimal in the end position.

12. An internal combustion engine with a control device according to claim 10.

13. The control device according to claim 10, wherein the internal combustion engine having a plurality of actuators, the position of which in each case has an influence on the combustion in at least one of the combustion chambers, and wherein for at least some of the actuators, the control device is operable to control each actuator individually.

14. The control device according to claim 10, wherein one of the actuators involved being a tank breather valve, which is arranged in a ventilation line between a fuel vapor reservoir and an inlet manifold of the internal combustion engine and which, in an open position, pneumatically connects the fuel vapor reservoir with the inlet manifold and, in a closed position, pneumatically disconnects the fuel vapor reservoir from the inlet manifold, and wherein the tank breather valve being closed in the event of the uneven running value exceeding the predefined first uneven running threshold value.

15. The control device according to claim 10, wherein the actuator involved being an exhaust gas recirculation valve, which is arranged in an exhaust gas recirculation line between an exhaust gas tract and an inlet manifold of the internal combustion engine and which, in an open position, pneumatically connects the exhaust gas tract with the inlet manifold and, in a closed position, pneumatically disconnects the exhaust gas tract from the inlet manifold, and wherein the exhaust gas recirculation valve being closed in the event of the uneven running value exceeding the predefined first uneven running threshold value.

16. The control device according to claim 10, wherein the actuator involved being a swirl flap, which is arranged in an intake tract of the internal combustion engine.

17. The control device according to claim 10, wherein the actuator involved being an adjusting mechanism for a valve by means of which the gas flow through the combustion chamber is controlled.

18. The control device according to claim 10, wherein, in the event of an improvement in the running smoothness when the actuator moves to the end position, the control device is operable to control the actuator to remain in the end position.

19. The control device according to claim 18, wherein, in the event of an improvement in the running smoothness when the actuator moves to the end position, the control device is operable to make an entry into a memory device allocated to the internal combustion engine.

* * * * *